US 6,828,563 B2

(12) United States Patent
Ducourant

(10) Patent No.: US 6,828,563 B2
(45) Date of Patent: Dec. 7, 2004

(54) METHOD FOR TEMPERATURE COMPENSATION OF AN IMAGE SENSOR SENSITIVITY

(75) Inventor: Thierry Ducourant, Voiron (FR)

(73) Assignee: Thales, Paris (FR)

( * ) Notice: Subject to any disclaimer, the term of this patent is extended or adjusted under 35 U.S.C. 154(b) by 208 days.

(21) Appl. No.: 10/168,522

(22) PCT Filed: Dec. 28, 2000

(86) PCT No.: PCT/FR00/03717

§ 371 (c)(1),
(2), (4) Date: Jun. 28, 2002

(87) PCT Pub. No.: WO01/49044

PCT Pub. Date: Jul. 5, 2001

(65) Prior Publication Data

US 2002/0195567 A1 Dec. 26, 2002

(30) Foreign Application Priority Data

Dec. 28, 1999 (FR) .............................. 99 16592

(51) Int. Cl.⁷ ................................................ G01T 1/16
(52) U.S. Cl. .............................. 250/370.11; 250/370.01; 250/336.1; 250/369
(58) Field of Search ....................... 250/370.11, 370.01, 250/336.1, 369

(56) References Cited

U.S. PATENT DOCUMENTS

| | | | |
|---|---|---|---|
| 5,777,495 A | 7/1998 | Arques et al. | |
| 5,861,913 A | 1/1999 | Tanaka | |
| 5,973,327 A | 10/1999 | Moy et al. | |
| 6,265,737 B1 | 7/2001 | Ducourant | |
| 6,271,880 B1 * | 8/2001 | Kameshima et al. | ........ 348/244 |
| 6,410,898 B2 | 6/2002 | Ducourant et al. | |
| 6,528,775 B2 * | 3/2003 | Ducourant | ................ 250/208.1 |
| 2002/0079450 A1 * | 6/2002 | Wood | .......................... 250/332 |
| 2003/0085885 A1 * | 5/2003 | Nakayoshi et al. | ......... 345/205 |
| 2003/0132391 A1 * | 7/2003 | Agano | .................... 250/370.11 |
| 2003/0184666 A1 * | 10/2003 | Jo | ............................... 348/308 |
| 2003/0197124 A1 * | 10/2003 | Wood | .......................... 250/332 |

FOREIGN PATENT DOCUMENTS

| | | |
|---|---|---|
| EP | 0 541 332 | 5/1993 |
| WO | 99 30506 | 6/1999 |

OTHER PUBLICATIONS

U.S. Appl. No. 09/367,869, filed Sep. 3, 1999, pending.
U.S. Appl. No. 09/555,517, filed Jun. 7, 2000, pending.
U.S. Appl. No. 09/736,121, filed Dec. 15, 2000, pending.
U.S. Appl. No. 09/926,834, filed Dec. 28, 2001, pending.

* cited by examiner

Primary Examiner—Constantine Hannaher
Assistant Examiner—Christine Sung
(74) Attorney, Agent, or Firm—Oblon, Spivak, McClelland, Maier & Neustadt, P.C.

(57) ABSTRACT

A method for temperature compensation of sensitivity of an image including photosensitive spots each with a photodiode connected to read circuits. The photosensitive spots are divided into detecting photosensitive spots, detecting an image when exposed to information carrying the image and sensitive to this information, and into blind spots protected from the information. When the photosensitive spots are taken to a reference temperature, an average leakage current in the photodiodes of the blind photosensitive spots is calculated and a first average is generated from signals from the blind photosensitive spots during a read operation. When the photosensitive spots are taken to an ambient temperature to be determined, another average is generated from signals from the blind photosensitive spots during another read operation. The ambient temperature is calculated from the average leakage current and from the distance between the two averages. A gain image or a quasi gain image matched to the ambient temperature is generated. An image recorded at the ambient temperature with the gain image or the quasi gain image is then corrected. Such a method may find application to radiological image detectors in particular.

18 Claims, 2 Drawing Sheets

METHOD FOR TEMPERATURE COMPENSATION OF AN IMAGE SENSOR SENSITIVITY

The present invention relates to solid-state image detectors and its purpose is to eliminate the variations in their sensitivity, especially those due to temperature variations.

In these image detectors, the acquisition of an image takes place with the aid of several photosensitive spots each formed from a photodiode and a switch. The photosensitive spots are produced with the aid of techniques for the thin-film deposition of semiconductor materials such as hydrogenated amorphous silicon (aSiH). These photosensitive points, arranged in the form of a matrix or linear array, make it possible to detect images contained within visible or near-visible radiation. The signals that are produced are then digitized so as to be able to be stored and processed easily.

These arrangements of photosensitive spots find one particularly advantageous application in the medical field or the field of industrial inspection, in which they detect radiological images. All that is required is to cover them with a scintillator and to expose the latter to X-radiation carrying a radiological image. The scintillator converts the incident X-radiation into radiation in the band of wavelengths to which the photosensitive spots are sensitive.

Figure 1:
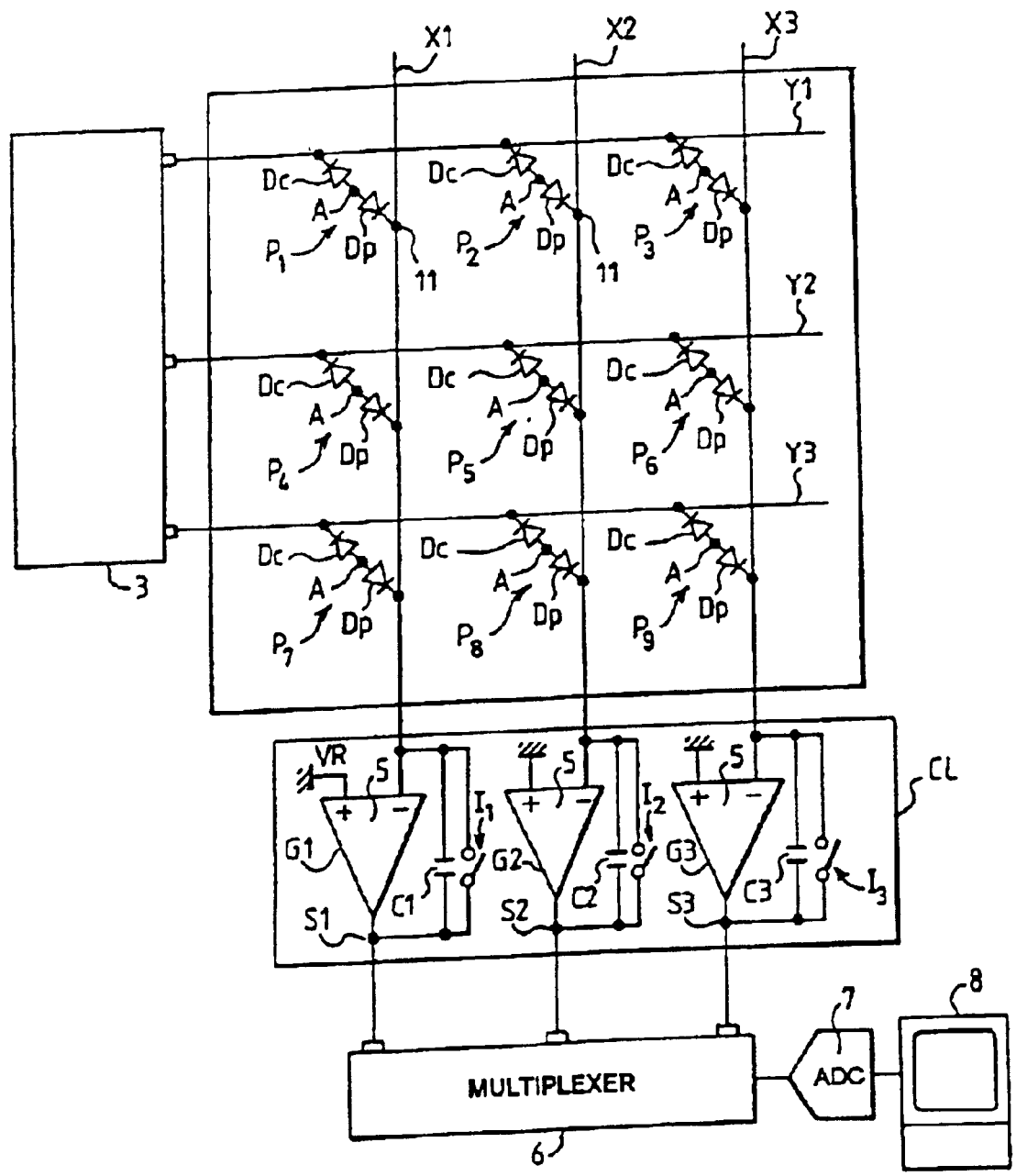

There are now large photosensitive matrices which may have several million photosensitive spots. FIG. 1 shows a matrix image detector of the known type. It has only nine photosensitive spots in order not unnecessarily clutter up the figure. Each photosensitive spot P1 to P9 is formed from a photodiode Dp and an element having a switch function Dc represented in the form of a switching diode. It would have been possible to choose a transistor as the element having a switching function. The photodiode Dp and the switching diode Dc are connected together in a head-to-tail arrangement.

Each photosensitive spot P1 to P9 is connected between a row conductor Y1 to Y3 and a column conductor X1 to X3. The row conductors Y1 to Y3 are connected to an addressing device 3 known as a driver. There may be several drivers 3 if the matrix is of large size. The addressing device 3 generally comprises shift registers, switching circuits and clock circuits. The addressing device 3 raises the row conductors Y1 to Y3 to voltages which either isolate the photosensitive spots P1 to P3 connected to the same row conductor Y1 from the rest of the matrix or turn them on. The addressing device 3 allows the row conductors Y1 to Y3 to be addressed sequentially.

The column conductors X1 to X3 are connected to a read device CL.

During an image record phase, during which the photosensitive spots P1 to P9 are exposed to information to be picked up and are in a receiving state, that is to say their reverse-biased photosensitive diodes Dp and switching diodes Dc each constitute a capacitor, there is a build up of charges at the junction point A between the two diodes Dp, Dc. The amount of charge is approximately proportional to the intensity of the signal received, whether this is very intense illumination, provided that the photosensitive diodes remain in the linear detection range, or darkness. There then follows a read phase, during which a read pulse is sequentially applied to the row conductors Y1 to Y3, which read pulse turns on the photodiodes Dp and makes it possible for the charges accumulated in the column conductors X1 to X3 to drain away to the read device CL and for them to be integrated.

A read device CL will now be explained in greater detail. It consists of as many read circuits 5 as there are column conductors X1 to X3 and these read circuits are of the charge-integrating circuit type. Each photosensitive spot is connected to a read circuit 5. Each charge-integrating circuit is formed by an operational amplifier G1 to G3 mounted as an integrator by means of a read capacitor C1 to C3. Each capacitor C1 to C3 is mounted between the negative input of the operational amplifier G1 to G3 and its output S1 to S3. Each column conductor X1 to X3 is connected to the negative input of an operational amplifier G1 to G3. The positive input of each of the operational amplifiers G1 to G3 is taken to a constant input reference voltage VR, which sets this reference voltage on each column conductor X1 to X3. Each operational amplifier G1 to G3 comprises a resetting switch I1 to I3 mounted in parallel with the capacitor C1 to C3.

The outputs S1 to S3 of the integrating circuits are connected to a multiplexing device 6 which delivers, as a series, signals corresponding to the charges which were integrated by the charge-integrating circuits. In the read phase, these signals correspond to the charges accumulated over an integration time by all the photosensitive spots of the same row. The signals delivered by the multiplexing device 6 are then digitized in at least one analog-digital converter 7, the digitized signals output by the analog-digital converter 7 translating the content of the image to be detected. These digitized signals are sent to a management system 8 which can store, process and display them.

It has turned out that the sensitivity of such detectors varies, which results both in local and overall variations in the brightness of the image detected. There are several causes of the variations in sensitivity. Firstly, there is a spatial variation and secondly a thermal variation. This means, on the one hand, that two photosensitive spots of the detector cannot give the same response when they are exposed to precisely the same luminous flux and, on the other hand, that a photosensitive spot exposed to the same luminous flux does not give the same response at 25° C. as it does at 35° C. These discrepancies are partly due to the semiconductor components constituting the photosensitive spots, which components do not all come from the same manufacturing batch, and partly to the scintillator material used in radiology. This results in images with nonuniform areas which should not be there and which become increasingly pale as the temperature increases.

Although it is known how to overcome the spatial variation in sensitivity by making a correction to the image with a so-called gain image, it is not possible to use the gain image to overcome thermally induced variations in sensitivity.

The gain image is an image taken with a calibrated uniform illumination in the absence of a subject or object to be examined. This gain image allows the spatial variations in sensitivity to be properly corrected, since with a uniform illumination the image should be uniform. This gain image is produced with a very low frequency, of the order of one year. The signals delivered by the photosensitive spots when the gain image is being read are stored in the management device 8 and then serve to correct, for spatial inhomogeneity in the sensitivity, any useful image.

This method cannot be used to overcome thermally induced variations in sensitivity: this would require producing gain images in synchronism with the temperature variations, which would significantly increase the frequency at which gain images are recorded. This is not compatible with the manner in which operators use such image detectors.

The present invention proposes the use of a gain image or a quasi gain image matched to the ambient temperature in order to obviate variations in the sensitivity of the image detector, especially thermally induced variations, but this gain image is not simply recorded just before making the correction, in order to be matched to the ambient temperature, but it is generated from a calculation resulting in the determination of the ambient temperature.

To achieve this, the present invention provides a method for temperature compensation of the sensitivity of an image comprising photosensitive spots, each with a photodiode, these being connected to read circuits, characterized in that the photosensitive spots are divided into detecting photosensitive spots, capable of detecting an image when they are exposed to information carrying the image and are sensitive to this information, and into blind spots protected from the information, and in that it consists:

when the photosensitive spots are taken to a reference temperature, in calculating an average leakage current in the photodiodes of the blind photosensitive spots and in generating an average from the signals delivered by the blind photosensitive spots during a read operation;

when the photosensitive spots are taken to an ambient temperature to be determined, in generating another average from the signal delivered by the blind photosensitive spots during another read operation;

in calculating the ambient temperature from the average leakage current and from the distance between the two averages;

in generating a gain image or a quasi gain image matched to the ambient temperature; and in correcting an image recorded at the ambient temperature with the gain image or the quasi gain image.

Preferably, the signals delivered for generating the first average and for generating the average at the ambient temperature to be determined correspond to charges integrated over a first integration time approximately equal to the nominal integration time of the image detector.

To calculate the average leakage current at the average reference temperature, it is possible to generate, at the reference temperature, a pair of averages from the signals delivered by the blind photosensitive spots over two different integration times and to make a calibration using the pair of averages.

One of the averages of the pair is advantageously the first average. The other average of the pair corresponds to charges integrated over an integration time longer than the nominal integration time of the image detector.

The gain image matched to the determined ambient temperature may be generated from a series of gain images stored beforehand in a memory device, each of them being recorded at a different particular temperature, all of these particular temperatures forming a range of temperatures at which the image detector is likely to operate.

The quasi gain image matched to the determined ambient temperature may be generated, advantageously, from a base gain image recorded at a base temperature and corrected with the aid of a coefficient of variation of the base gain image as a function of temperature and taking into account the difference between the determined ambient temperature and the base temperature.

The base temperature may be the reference temperature. Advantageously, the averages may be generated from black images.

The present invention also relates to an image detector for implementing the compensation method, comprising photosensitive spots each with a photodiode, these photosensitive spots being connected to read circuits. These photosensitive spots are divided into detecting photosensitive spots, capable of detecting an image when they are exposed to information carrying the image, and into blind spots protected from the information. The detector comprises means for calculating the averages from the signals delivered by the blind photosensitive spots, means for calculating the average leakage current in the diodes of the blind photosensitive spots, means for calculating the ambient temperature from the average leakage current and from the distance between averages, means for generating the gain image or the quasi gain image from the calculated ambient temperature and means for correcting an image recorded at the ambient temperature with the gain image or the quasi gain image.

The means for calculating the average leakage current receive the averages of the signals delivered by the blind photosensitive spots in digital form. The means for generating the gain image may comprise a memory device containing one or more gain images, each corresponding to one temperature.

The means for generating the quasi gain image may comprise a memory device containing a base gain image recorded at a base temperature and a coefficient of variation of the base image with temperature.

It is preferable for the blind photosensitive spots to be connected to outermost portions of conductors to which the detecting photosensitive spots are connected. The blind photosensitive spots are covered with a material opaque to the information received by the detecting photosensitive spots, this material being in particular black paint.

The detecting photosensitive spots are covered with a scintillator material which converts X-radiation into radiation to which they are sensitive, the blind photosensitive spots being covered with an X-ray-opaque material, such as lead.

The material opaque to the information lies between the X-ray-opaque material and the blind photosensitive spots.

Further features and advantages of the invention will become apparent on reading the description which follows, illustrated by the figures, in which:

FIG. 1, already described, shows an example of a known image detector; and

Figure 2:
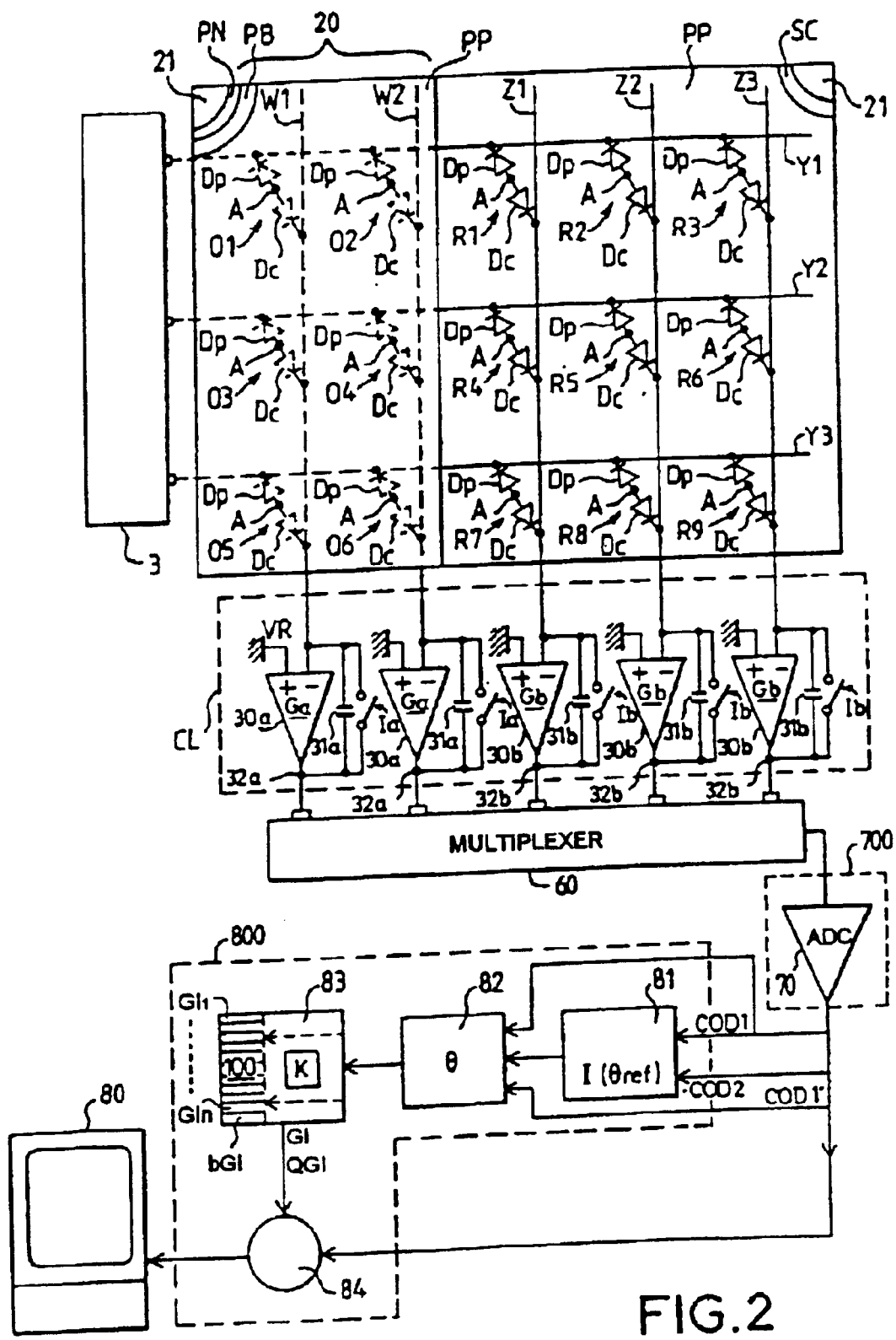

FIG. 2 shows an example of an image detector according to the invention, capable of operating with the method according to the invention.

In the manner indicated in FIG. 1, the photosensitive spots O1 to O6 and R1 to R9 are shown with a photodiode Dp and an element having a switch function Dc shown in the form of a switching diode. This switching diode could be replaced by a transistor. The photodiode Dp and the switching diode Dc are connected together in a head-to-tail arrangement. Each photosensitive spot is connected between a row conductor Y1 to Y3 and a column conductor W1, W2 and Z1 to Z3. The photosensitive spots O1 to O6 and R1 to R9 are arranged in a matrix of rows and columns, but they could be arranged in a linear array. Compared with the example in FIG. 1, the image detector shown has more photosensitive spots and more column conductors, but the same number of row conductors. The row conductors are connected to an addressing device 3 similar to that described in FIG. 1.

According to one feature of the invention, the photosensitive spots are divided into two groups—detecting photosensitive spots R1 to R9 which, when they are exposed to information carrying an image and are sensitive to this image, are capable of detecting the image, and blind photosensitive spots O1 to O6 used for compensation. These blind photosensitive spots O1 to O6 are masked from the information carrying an image to be detected. During detection of an image, whether this is the image of an object or of a patient, or even a black (unilluminated) or gain image, the blind photosensitive spots receive nothing. These blind photosensitive spots O1 to O6 will be read in the same way as the detecting photosensitive spots R1 to R9.

The blind photosensitive spots O1 to O6 are connected to outermost portions 20 of the row conductors Y1 to Y3. In the example described, they are located at the start of a row, but they could be located at the end of a row.

The number of blind photosensitive spots is not critical—about 10 per row seems reasonable if a row numbers about 2,000 detecting photosensitive spots. These photosensitive spots O1 to O6, R1 to R9 are implanted in an insulating substrate with the reference 21.

To mask the blind photosensitive spots O1 to O6 from the information to which the detecting photosensitive spots are exposed, they are covered with a material PN opaque to the information received by the detecting photosensitive spots—black paint for example is very suitable.

In the configuration in which the image detector according to the invention is used in a radiological application, the detecting photosensitive spots R1 to R9 are covered with a scintillator material SC which coverts X-radiation into radiation in the band of wavelengths at which the detecting photosensitive spots R1 to R9 are sensitive. As regards the blind photosensitive spots O1 to O6, these are not covered with the scintillator material SC but with an X-ray-opaque material PB, for example a layer of lead. In this configuration, the material PN opaque to the information received by the detecting photosensitive spots is optional, but if one is used it is placed between the blind photosensitive spots O1 to O6 and the X-ray-opaque material PB.

The entire surface of the image detector on that side facing the X-radiation is covered with a protective material PP based for example on carbon fibers. In FIG. 2, these materials are shown only partly.

As in the example in FIG. 1, the read device CL has as many read circuits 30a, 30b as there are column conductors W1, W2 and Z1 to Z3 and each of these read circuits is of the charge-integrating circuit type with an operational amplifier Ga, Gb mounted as an integrator with the aid of a read capacitor 31a, 31b and a resetting switch Ia, Ib mounted in parallel with the read capacitor 31a, 31b. As in FIG. 1, the outputs 32a, 32b of the integrating circuits Ga, Gb are connected to a multiplexing device 60 which delivers, as a series, signals corresponding to the charges which were integrated by the charge-integrating circuits. The signals delivered by the multiplexing device 60 are then digitized in at least one analog-digital converter (ADc) 70. The signals output by the read circuits 30b connected to the detecting photosensitive spots R1 to R9 translate the image to be detected, while the other signals output by the read circuit 30a connected to the blind photosensitive spots O1 to O6 serve for compensation.

The digitized signals are then transmitted to a management system 80 which can store, process and display them.

According to the method of the invention, when the photosensitive spots are taken to a reference temperature θref, an average leakage current Iθref in the photodiodes of the blind photosensitive spots is calculated and a first average COD1 is generated from the signals delivered by the blind photosensitive spots O1 to O6 during a read operation. The reference temperature may be measured by means of a thermometer.

When the photosensitive spots are taken to an ambient temperature θ to be determined, another average COD1' is generated from the signals delivered by the blind photosensitive spots O1 to O6 during another read operation.

The two averages COD1, COD1' are used in digital form and it is preferable for them to be produced from the signals delivered by the blind photosensitive spots already converted by the analog-digital converter 70.

It may even be envisioned that it is the analog-digital converter 70 which delivers the averages. However, it is possible to produce the averages in analog form and to carry out the conversion subsequently. In the non-limiting example in FIG. 2, the means 700 for generating the averages are shown schematically by dashed lines and include the analog digital converter 70.

The signals used to generate the first average COD1 correspond to the charges stored by the blind photosensitive spots with a first integration time t1. This first integration time is preferably more or less the nominal integration time of the detector, that is to say the integration time corresponding to a standard use of the detector. For example, t1 may be given a value of between 0.5 and 5 seconds.

Likewise, the signals used to generate the other average COD1', at the ambient temperature to be determined, correspond to the charges stored by the blind photosensitive spots with an integration time t1' and it is preferable for this integration time t'1 to be approximately equal to the nominal integration time of the detector and therefore approximately equal to t1.

The ambient temperature θ is calculated from the difference between the averages COD1', COD1 and from the average leakage current Iθref at the reference temperature.

Next, a gain image GI or a quasi gain image QGI matched to the determined ambient temperature θ is generated in order to correct a detected image, although the photosensitive spots are still at the determined ambient temperature θ.

An example of how these various steps are carried out will now be presented. The leakage current in a photodiode varies exponentially with temperature. This leakage current is given by the following formula:

$$I\theta = I\theta\text{ref} \times 10^{(\theta - \theta ref)/\theta}.$$

The current IP from a photosensitive spot is given by:

$$Ip = \frac{COD \times FSR \times C_{read}}{2^n Gt}$$

with:

COD: the code, expressed in binary (LSB), delivered by the analog-digital converter 70 during an operation to read the charges stored by this photosensitive spot after an integration time of t. The integration time t corresponds to the time elapsed between two successive trainings of the charges accumulated at point A of the photosensitive spot. COD can take values from 0 to $2^{14}$ if the converter possesses 14 bits;

FSR: the encoding voltage range of the analog-digital converter. This range may have a value of 4 volts for example;

n is the resolution of the analog-digital converter. This resolution may be 14 bits for example;

$C_{read}$ represents the equivalent read capacitance at the output of the read circuit CL; and G: the voltage gain separating the output of the read circuit from the input of the analog-digital converter.

During an operation to read a blind photosensitive spot O1 to O6 (which therefore has not been exposed to illumination), the charges accumulated by this photosensitive spot do not correspond exactly to the leakage current of the photodiode. These charges also include drive charges created in the photosensitive spot from the pulses which the addressing device 3 receives and from the charges coming from the photosensitive spots connected to the same column conductor as that which is read.

To obviate these additional charges, a calibration operation is carried out to calculate the leakage current. When the photosensitive spots are taken to the reference temperature θ ref, a pair of averages COD1, COD2 is generated from the signals delivered by the blind photosensitive spots with two different integration times.

It has been assumed below, for the purpose of nonlimiting simplification that one of the averages of the pair, COD1, corresponds to that generated at the reference temperature θ ref, but for the purpose of calculating the temperature θ to be determined. The other average, COD2, of the pair is generated from the signals delivered by the blind photosensitive spots O1 to O6 during a second read operation at the reference temperature θref.

The integration time t1 relating to the first average COD1 of the pair is approximately the nominal integration time of the detector. The integration time t2 relating to the second average COD2 of the pair is longer than the first time t1. It may be chosen for example to be 2 to 10 times longer than the time t1. This time t2 may have a value from 1 to 20 seconds.

It is preferable that the read operations for calculating the average leakage current and for generating the averages be carried out from black images obtained when the photosensitive spots are not exposed to any illumination. In a radiological application, this makes it possible to dispense with X-radiation. However, the use of useful images could be envisioned.

With these two averages COD1, COD2, it is then easy to calculate the average leakage current Iθ ref at the reference temperature θref from the formula:

$$I\theta ref = \frac{(COD2 - COD1) \times SFR \times C_{read}}{2^n G(t2 - t1)}.$$

The ambient temperature θ to be determined may then be calculated from the formula:

$$\theta = \theta ref \left[1 + \log\left(1 - \left[\frac{(COD1' - COD1) \times FSR \times C_{read}}{2^n \times G \times I\theta ref \times t1'}\right]\right)\right]$$

When the ambient temperature θ has been calculated, all that is required is to generate a gain image GI or a quasi gain image QGI matched to this ambient temperature θ, and this gain image GI or this quasi gain image QGI will be used for digitally correcting, in terms of sensitivity, a useful image at the temperature θ.

The gain image GI matched to the temperature may be generated from a series of gain images $GI_1 \ldots GI_n$ stored beforehand in a memory device 100, each of them being associated with one temperature. The image detector is subjected beforehand to a series of temperatures at which there is a risk of it having to operate, and for each of them, a gain image $GI_1 \ldots GI_n$ stored in the memory device 100 so as to constitute a library of gain images $GI_1 \ldots GI_n$ is recorded.

If a less precise correction is acceptable, all that is required is to record a base gain image bGI at a base temperature and determine a coefficient K of variation of the base gain image as a function of temperature. The base gain image bGI is stored in the memory device 100. This variant requires appreciably less memory capacity. The quasi gain image QGI is obtained by applying the coefficient K to the base gain image bGI using the difference between the base temperature and the calculated ambient temperature. The base temperature may also be the reference temperature θref.

FIG. 2 shows the two variants illustrated in the same memory device, but this is not limiting. Measurements performed show that the coefficient K is around −0.5%/° C.

All the functions that have just been described may be produced by the management device 80 itself, or by any processing unit 800 placed between the analog-to-digital converter 70 and the management device 80, which then allows the corrected images to be used. FIG. 2 shows in detail the configuration with a processing unit 800 which includes the means 81 for calculating the average leakage current, the means 82 for calculating the ambient temperature θ to be determined, the means 83 for generating the gain image GI or the quasi gain image QGI which cooperate with the memory device 100 and the correction means 84. These correction means 84 receive the signals delivered by the photosensitive spots during an operation to read a useful image to be corrected. These signals are delivered by the analog-digital converter 70.

What is claimed is:

1. A method for temperature compensation of sensitivity of an image including photosensitive spots each with a photodiode, the photodiodes being connected to read circuits, wherein the photosensitive spots are divided into detecting photosensitive spots, configured to detect an image when they are exposed to information carrying the image and are sensitive to this information, and into blind spots protected from the information, comprising:

when the photosensitive spots are taken to a reference temperature, calculating a first average leakage current in the photodiodes of the blind photosensitive spots and generating a first average from signals delivered by the blind photosensitive spots during a first read operation;

when the photosensitive spots are taken to an ambient temperature to be determined, generating a second average from signals delivered by the blind photosensitive spots during a second read operation;

calculating the ambient temperature from the average leakage current and from a difference between the first and second averages;

generating a gain image or a quasi gain image matched to the ambient temperature; and correcting an image recorded at the ambient temperature with the gain image or the quasi gain image.

2. The compensation method as claimed in claim 1, wherein the signals delivered for generating the first average and for generating the second average at the ambient temperature to be determined correspond to charges integrated over an integration time approximately equal to a nominal integration time of the image detector.

3. The compensation method as claimed in claim 1, further comprising, at the reference temperature, to calculate the average leakage current, generating a pair of averages from the signals delivered by the blind photosensitive spots over two different integration times and making a calibration using the pair of averages.

4. The compensation method as claimed in claim 3, wherein one average of the pair of averages is the first average.

5. The compensation method as claimed in claim 4, wherein the other average of the pair of averages corresponds to charges integrated over an integration time longer than a nominal integration time of the image detector.

6. The compensation method as claimed in claim 1, further comprising generating the gain image matched to the determined temperature from a series of gain images previously stored in a memory device, each of the series of gain images recorded at a different particular temperature, all of the particular temperatures forming a range of temperatures at which the image detector is likely to operate.

7. The compensation method as claimed in claim 1, further comprising generating the quasi gain image matched to the determined ambient temperature, from a base gain image recorded at a base temperature, corrected with aid of a coefficient of variation of the base gain image with temperature, taking into account a difference between the calculated ambient temperature and the base temperature.

8. The compensation method as claimed in claim 1, further comprising carrying out the read operations for generating the first and second averages on a black image.

9. An image detector for implementing the method as claimed in claim 1, comprising:
 the photosensitive spots each with the photodiode, the photosensitive spots being connected to the read circuits, wherein the photosensitive spots are divided into the detecting photosensitive spots, configured to detect an image when exposed to information carrying the image, and into the blind spots protected from the information;
 means for calculating the first and second averages from the signals delivered by the blind photosensitive spots;
 means for calculating the average leakage current in the photodiodes of the blind photosensitive spots;
 means for calculating the ambient temperature from the average leakage current and from the difference between averages;
 means for generating the gain image or the quasi gain image from the calculated ambient temperature; and
 means for correcting an image recorded at the ambient temperature with the gain image or the quasi gain image.

10. The image detector as claimed in claim 9, wherein the means for calculating the average leakage current receives the first and second averages in digital form.

11. The image detector as claimed in claim 9, wherein the means for generating the gain image comprises a memory device containing one or more gain images each corresponding to one temperature.

12. The image detector as claimed in claim 9, wherein the means for generating the quasi gain image comprises a memory device containing a base gain image recorded at a base temperature and a coefficient of variation of the base image with temperature.

13. The image detector as claimed in claim 9, wherein the blind photosensitive spots are connected to outermost portions of the conductors to which the detecting photosensitive spots are connected.

14. The image detector as claimed in claim 9, wherein the blind photosensitive spots are covered with a material opaque to the information received by the detecting photosensitive spots.

15. The image detector as claimed in claim 14, wherein the material comprises black paint.

16. The image detector as claimed in claim 14, wherein the detecting photosensitive spots are covered with a scintillator material that converts X-radiation into radiation to which they are sensitive, the blind photosensitive spots being covered with an X-ray-opaque material.

17. The detector as claimed in claim 16, wherein the X-ray-opaque material comprises lead.

18. The detector as claimed in claim 16, wherein the material opaque to the information lies between the X-ray-opaque material and the blind photosensitive spots.

* * * * *